United States Patent [19]

Okamoto et al.

[11] 4,433,124

[45] Feb. 21, 1984

[54] ADHESIVE COMPOSITIONS

[75] Inventors: Takanori Okamoto; Hisakazu Mori, both of Kagawa; Hideaki Matsuda, Kawaga, all of Japan

[73] Assignee: Okura Kogyo Kabushiki Haisha, Japan

[21] Appl. No.: 323,922

[22] Filed: Nov. 23, 1981

[30] Foreign Application Priority Data

Dec. 13, 1980 [JP] Japan .............................. 55-175245

[51] Int. Cl.$^3$ .................... C08F 220/28; C08F 230/02
[52] U.S. Cl. ..................................... 526/277; 428/463
[58] Field of Search ......................................... 526/277

[56] References Cited

U.S. PATENT DOCUMENTS 4,044,044  8/1977  Saito .................................... 526/277
4,374,940  2/1983  Bhatia ............................... 526/323.1

Primary Examiner—Harry Wong, Jr.
Attorney, Agent, or Firm—Jacobs & Jacobs

[57] ABSTRACT

There is provided a one-part structural adhesive composition having satisfactory adhesive to plane surfaces and oily surface-adhesion properties. The adhesive composition comprises substantial amounts of a hydroxyl-containing polymerizable methacrylate represented by a certain general formula and a polymerizable methacrylate having 2 or more methacrylic groups as well as small amounts of a polymerizable organic phosphate represented by a certain general formula, tetrahydroquinoline salt of o-benzoic sulfimide, an organic hydroperoxide and water; the amounts of the above-mentioned components in the composition being within defined ranges.

9 Claims, No Drawings

ADHESIVE COMPOSITIONS

BACKGROUND OF THE INVENTION

This invention relates to a one-part structural adhesive composition which bonds metallic substrates at room temperature in a very short period of time and is also excellent in adhesive strength to plane surfaces and oily surface-adhesion properties. In other words, this invention provides a one-part adhesive composition which is quick curing and is capable of setting metal to metal and the like within a few minutes and reaching practical adhesive strength within a few hours. The adhesive composition has excellent adhesive strengths to plane surface as well as excellent oily surface-adhesion properties.

Epoxy resins have been generally used as non-solvent structural adhesive agents in a great quantity since they have excellent adhesive strength to plane surfaces. In the case of two-part type epoxy resins, there are problems in that it is necessary to weigh each component and mix them sufficiently immediately before use and to use all the mixed adhesive within a limited time, and the curing agents are harmful to human skin due to curing agents. In the case of one-part type epoxy resins, there are also problems in that they need a high curing temperature of 120° C. or more and have a short shelf life, although they need no mixing operation and provide good workability.

On the other hand, acrylic structural adhesive agents have been recently used in some fields. These acrylic adhesives are a non-mixing two-part type comprising a primer and a main ingredient. The primer containing a curing accelerator is coated onto one adherent surface immediately before bonding, and then the main ingredient is coated onto the other adherent surface. These two surfaces are rubbed against each other to fit them. These adhesives are characterized by no need for mixing two components, good workability, bonding at room temperature in a short time and adhesive strengths comparable to epoxy resins. These adhesives have defects, however, in that two-step bonding operations are required, although they need no mixing, and also the primer containing a curing accelerator is very irritative.

The present invention provides an acrylic structural adhesive agent which is of the one-part type and which is less irritative and has excellent adhesive strengths to plane surfaces and excellent oily surface-adhesion properties.

SUMMARY OF THE INVENTION

In accordance with the present invention, there is provided an adhesive composition which comprises
(i) 100 parts by weight of a mixture consisting of 90 to 20% by weight of a hydroxyl-containing polymerizable methacrylate represented by the following general formula (1),

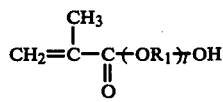

wherein $R_1$ is an alkylene group having 2 to 4 carbon atoms and $l$ stands for an integer of from 1 to 8, and 10 to 80% by weight of a polymerizable methacrylate having 2 or more methacrylic groups; and
(ii) the following components (a) through (d)
(a) 0.02 to 0.5 part by weight of a polymerizable organic phosphate represented by the following general formula (2),

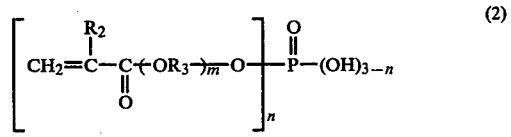

wherein $R_2$ is hydrogen or methyl group, $R_3$ is an alkylene or halogenoalkylene group having 2 to 4 carbon atoms, m stands for an integer of from 1 to 8, and n stands for an integer of 1 or 2,
(b) 0.5 to 5 parts by weight of 1,2,3,4-tetrahydroquinoline salt of o-benzoic sulfimide,
(c) 0.005 to 1.0 part by weight of an organic hydroperoxide, and
(d) 0.2 to 2.5 parts by weight of water.

DETAILED DESCRIPTION OF THE INVENTION

The component represented by the general formula (1) is a monomethacrylate of an alkylene glycol or a polyalkylene glycol having the degree of polymerization of 2 to 45, which is an essential monomer component for achieving strong adhesive strengths to plane surfaces and oily surface-adhesion properties in the present composition. The component of the formula (1) is required to be present in an amount of 20% by weight or more so that water is dissolved uniformly in the present composition. Incidentally, more than 90% of the component of the formula (1) will result in inferior properties of the present composition. Examples of the component of the formula (1) include hydroxyethyl methacrylate, hydroxypropyl methacrylate, hydroxybutyl methacrylate, polyethyleneglycol monomethacrylate, polypropyleneglycol monomethacrylate, and mixtures thereof and the like.

The polymerizable methacrylates having 2 or more methacryl groups are used to obtain higher resistance to water, resistance to heat and adhesion properties than those obtained by using the monomers of the general formula (1) alone. Examples of these polymerizable methacrylates include a polyalkylene glycol dimethacrylate; a polyhydric alcohol polymethacrylate; a dimethacrylate of an alkylene oxide adduct of Bisphenol A; an epoxymethacrylate obtained by addition of methacrylic acid to a bisepoxide; a polyester methacrylate obtained by esterification of a dibasic acid, a glycol and methacrylic acid; a terminal-methacrylated product of a liquid rubber; a polyurethane methacrylate obtained by addition reaction of an isocyanate-terminated urethane prepolymer with a hydroxyalkyl methacrylate and mixtures thereof and the like.

Of these methacrylates, totally excellent adhesion properties are obtained by using the dimethacrylate of an alkylene oxide adduct of Bisphenol A wherein the addition amount of the alkylene oxide is 3 mols or less per mol of Bisphenol A, and the polyurethane methacrylate. Incidentally, the corresponding acrylates may be used instead of these methacrylates, but they are not desirable in view of skin-irritation, bad odors and the like.

The polymerizable phosphates represented by the general formula (2) are used in a small amount for the purpose of improving the adhesive strengths to plane surfaces and oily surface-adhesion properties markedly in the present invention. In this connection, the present inventors had proposed a curable composition containing the polymerizable phosphate represented by the formula (2) and suggested that the phosphate is also useful for an adhesive (cf. Japanese Patent No. 676877, Japanese Patent Publication No. 29490/1972 Gazette). As a result of further researches, the present inventors have found that combination of the polymerizable phosphate with a polymerizable methacrylate having a certain constitution provides very excellent adhesive strengths to plane surfaces and oily surface-adhesion properties in the co-presence of 1,2,3,4-tetrahydroquinoline salt of o-benzoic sulfimide (hereinafter referred to as SQ salt), a hydroperoxide and water. Thus the present invention has been accomplished. In comparison with the case where no polymerizable phosphate is used in the present invention, incorporation of the polymerizable phosphate enhances the impact strength and the like of the resulting composition several times, provides excellent oily surface-adhesion properties, and also gives the composition adhesive strengths equal to epoxy resins in spite of its one-part type structure. This is considered to be due to the fact that the monomer component used in the present invention has a good wetting property to metal and also has a relatively good affinity for oil, and thus the present composition can absorb the oil and be bonded to the metal surfaces on which a small amount of oil has been deposited as well as the fact that free phosphoric acid groups in the polymerizable phosphate can activate the metal surface.

Examples of the polymerizable phosphates of the general formula (2) include methacryloyloxyethyl acid phosphate, bis(methacryloyloxyethyl) acid phosphate, methacryloyloxypropyl acid phosphate, bis(methacryloyloxypropyl) acid phosphate, methacryloyloxychloropropyl acid phosphate, bis(methacryloyloxychloropropyl) acid phosphate, and the corresponding acryloyloxy-type acid phosphates thereof, etc. They can be used alone or in combination. They are commercially available, and they can also be readily prepared in addition reaction of hydroxyalkyl methacrylates and phosphorus pentaoxide. For example, hydroxychloropropyl methacrylate and phosphorus pentaoxide in a molar ratio of 3 to 1 are subject to addition reaction in the absence of solvent at a temperature of room temperature to 90° C. to readily obtain the equimolar mixture of the phosphates of the formula (2) wherein n=1 and 2. The resulting mixture can be incorporated without separation into the composition. The amount to be incorporated of the polymerizable phosphate represented by the general formula (2) is generally 0.02 to 0.5 part and preferably 0.05 to 0.3 part by weight to 100 parts by weight of a mixture consisting of 90 to 20% by weight of the polymerizable methacrylate monomer represented by the general formula (1) and the polymerizable methacrylate having 2 or more methacrylic groups. If the amount is larger than the above-defined range, the resulting adhesive strengths are lowered and the corrosive property to metal due to phosphoric acid groups is generated. On the contrary, the smaller amount than the range fails to give the adhesive strengths aimed in the present invention.

The above-mentioned SQ salt can be readily obtained by subjecting o-benzoic sulfimide and 1,2,3,4-tetrahydroquinoline to equivalent addition reaction in an inert solvent. The SQ salt acts as a strong cure accelerator. The curing action is so strong that only a very small amount of the hydroperoxide (curing agent) is needed. Although o-benzoic sulfimide and 1,2,3,4-tetrahydroquinoline are slightly soluble or insoluble in water, the resulting SQ salt is easily soluble in water. It is thus considered that the action of the SQ salt is markedly enhanced in the presence of water which is one component in the present composition. The amount to be incorporated of the SQ salt is 0.5 to 5 parts by weight to 100 parts by weight of a mixture consisting of 90 to 20% by weight of the polymerizable methacrylate represented by the general formula (1) and 10 to 80% by weight of a polymerizable methacrylate having 2 or more methacrylic groups. Even if the amount incorporated is larger than 5 parts by weight, the performances of the resulting composition are not enhanced. When the amount is smaller than 0.5 part by weight, the adhesive performances are lowered.

The hydroperoxides are incorporated in an amount of 0.005 to 1.0 part and preferably 0.01 to 0.5 part by weight to 100 parts by weight of the above-mentioned polymerizable methacrylate mixture. Organic peroxides other than hydroperoxides can be used, but hydroperoxides are most suitable in view of adhesion velocity and stability. In the present invention, incorporation of such a very small amount of hydroperoxides is satisfactory; a large amount of 2% or more is not needed as required in the case of conventional acrylic adhesives. Incidentally, when 2% or more of organic peroxide is used, the resulting mixture has a stronger odor and also gives stronger irritation to human skins. Thus, it is desired to use the peroxides in an amount as small as possible and especially in an amount of 1% or less. In conventional compositions, however, a smaller amount (for example, less than 1%) of organic peroxides added results in lower adhesion velocity and adhesive strengths. In the present invention, the peroxides in a very small amount of 0.1% or less produce good adhesion properties, and it is very advantageous from the viewpoint of the sanitary conditions of laborers. Examples of hydroperoxides include t-butyl hydroperoxide, p-menthane hydroperoxide, cumene hydroperoxide, diisopropylbenzene hydroperoxide, and mixtures thereof and the like.

Water is an essential component in the present invention to increase the adhesion velocity markedly and enhance the adhesive strengths to plane surfaces. Water is incorporated in an amount of 0.2 to 2.5 parts and preferably 0.5 to 1.5 parts by weight to 100 parts by weight of the above-described polymerizable methacrylate mixture. The incorporation of water results in markedly quick adhesion. The resulting composition inspite of its one-part type can be set within a few minutes and reach final adhesion strengths in a few hours. There is no need to coat an irritating amine-type cure accelerator as primer, as in the case of conventional structural acrylic adhesives. The action of water in the present invention is considered to be due to the fact that both the SQ salt and the polymerizable phosphate are ionic compounds and their catalytic activities are enhanced markedly in the presence of water. Incidentally suitable amounts of optional components such as coloring agents thickening agents, thixotropic agents and plasticizers can be incorporated into the present composition.

As described above, the adhesive composition obtained in accordance with the present invention, although it is of one-part non-solvent type, is very quickly curable, needs no primer, has adhesive strengths to plane surfaces equal to those of epoxy resins, and is also excellent in oily surface-adhesion properties. Thus, the defects in conventional adhesives have been improved markedly.

The present invention is further explained in detail by way of the following examples, reference example and comparative examples, wherein all the parts are by weight.

REFERENCE EXAMPLE

Synthesis of SQ Salt

One (1) mol of o-benzoic sulfimide was added into 1 liter of ethanol, and then 1.1 mols of 1,2,3,4-tetrahydroquinoline was slowly added thereto with stirring at room temperature. The stirring was continued for 3 hours after the addition was completed, and then the reaction mixture was allowed to stand at 5° C. for 5 hours. The SQ salt was separated out as crystals. Ethanol and an excess amount of 1,2,3,4-tetrahydroquinoline were removed by filtration and the crystals were dried under reduced pressure. The resulting SQ salt was prism-like crystals easily soluble in water having an endothermic peak at 140.5° C. by a differential thermal analysis. The structural formula thereof is shown below. The elemental analysis values are shown in the following table, which conform to the theoretical values.

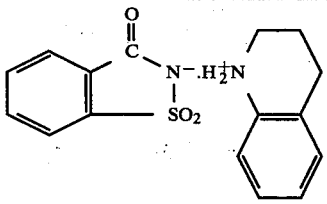

| Carbon | | Hydrogen | | Nitrogen | |
|---|---|---|---|---|---|
| found | calculated | found | calculated | found | calculated |
| 60.75% | 60.74% | 5.00% | 5.10% | 8.80% | 8.85% |

EXAMPLE 1

To a mixture of 50 parts of 2-hydroxypropyl methacrylate and 50 parts of dimethacrylate of a 2.6 mol-ethylene oxide adduct (an average addition amount) of Bisphenol A (NK ester BPE 2.6 produced by Shin-nakamura Kagaku Kogyo K.K., Japan, hereinafter referred to as BPE 2.6) was added 7.5 parts of an acrylic polymer having a polymerization degree of about 1,000 and a molecular weight of about 100,000 (DIANAL BR 75 produced by Mitsubishi Rayon K.K., Japan). The mixture was dissolved by heating at 80° C. for 2 hours. Thereto were then added 1.5 parts of SQ salt obtained in Reference example. The resulting mixture was dissolved by heating for 10 minutes, cooled to room temperature, then incorporated with 0.5 part of cumene hydroperoxide and 1.5 parts of water, and dissolved with stirring. To the resulting systems were added 0.1 part each of various polymerizable phosphates. Properties of the resulting composition were determined and shown in Table 1. Incidentally, the measurements of properties were conducted by the following methods.

Measurement of adhesive strengths

Tensile shear strength: ASTM D1002-64, adherent . . . hot rolled mild steel sheet of 1.6 mm thick Cleavage strength: ASTM D1062-51, adherent . . . rolled steel stock SS41 (JIS G3101) for general structures Impact strength: ASTM D950-54, adherent . . . as defined above Surface treatment of adherent: abraded by No. 240 sand paper (JIS R6251) and then defatted with trichloroethylene Temperature and humidity at measurement: 23° C., 50% RH Adhesion time: 24 hours Measurement of setting time Two (2) sheets of SS41 steel stock (JIS G3101) having a surface area of 3 cm² (adhered portion) which had been abraded by No. 240 sand paper (JIS R6251) and defatted were bonded together with an adhesive to be tested. The setting time was determined by measuring the time taken from the bonding to the state of adhesion where the bonded sheets could not tear off by hands (about 5 to 10 Kg/cm²).

Gelling stability at 50° C.

Fifty (50) ml of an adhesive agent was placed in a 100 ml polyethylene vessel. The period of time until the adhesive agent increased its viscosity or gelled was measured in a dryer at 50° C. The present inventors have confirmed that in the case where an adhesive agent is normal for 10 days or more in that condition, the adhesive is stable at room temperature for 6 to 12 months or more. Incidentally the time for an adhesive agent to reach practical strengths which are ½ of final adhesive strengths was also measured and it has been found that the present compositions reached the practical strengths within 2 hours.

TABLE I

| Types of polymerizable phosphates | Setting time (minutes) | Gelling time at 50° C. (days) | Tensile shear strength (Kg/cm²) | Cleavage strength (Kg/25.4 mm) | Impact strength (Kg-cm/cm²) |
|---|---|---|---|---|---|
| (1) Phosmer-M from Yushi Seihin K.K., Japan | 6–7 | >10 | 87.5 | 341 | 8.0 |
| (2) JPA 514 from Johoku Kagaku K.K., Japan | 5–6 | " | 93.6 | 483 | 8.0 |
| (3) MR-200 from K.K. Daihachi Kagaku Kogyosho, Japan | 3–4 | " | 106.9 | 483 | 8.9 |
| (4) Phosmer-CL from Yushi Seihin K.K., Japan | 5–6 | " | 80.0 | 440 | 8.0 |
| (5) Reaction product of 2-hydroxychloropropyl methacrylate and phosphorus pentaoxide in a molar ratio of 3:1 | 4–5 | " | 100.5 | 387 | 7.5 |

TABLE I-continued

| Types of polymerizable phosphates | Setting time (minutes) | Gelling time at 50° C. (days) | Tensile shear strength (Kg/cm²) | Cleavage strength (Kg/25.4 mm) | Impact strength (Kg-cm/cm²) |
| --- | --- | --- | --- | --- | --- |
| (6) Reaction product of 2-hydroxypropyl methacrylate and phosphorus pentaoxide in a molar ratio of 3:1 | 5–6 | " | 134.6 | 411 | 7.8 |

The structural formulas of the polymerizable phosphates indicated by (1) through (6) shown in Table 1 are given in the following.

(1) $CH_2{=}\overset{\underset{\displaystyle CH_3}{|}}{C}{-}COOCH_2CH_2O\overset{\underset{\displaystyle O}{\|}}{P}{-}(OH)_2$ (2) $(CH_2{=}\overset{\underset{\displaystyle CH_3}{|}}{C}{-}COOCH_2CH_2O)_2{-}\overset{\underset{\displaystyle O}{\|}}{P}{-}OH$ (3) $(CH_2{=}\overset{\underset{\displaystyle CH_3}{|}}{C}{-}COOCH_2CH_2O)_{\overline{n}}\overset{\underset{\displaystyle O}{\|}}{P}{-}(OH)_{3-n}$
(equimolar mixture wherein n = 1 and 2)

(4) 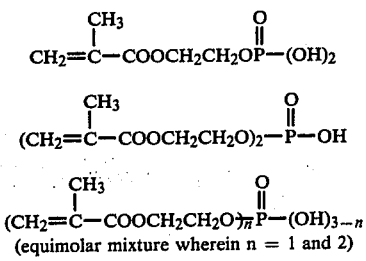

EXAMPLE 2, AND COMPARATIVE EXAMPLES 1 THROUGH 3

Adhesive agents were prepared in the same way as in Example 1, from 50 parts of 2-hydroxypropyl methacrylate, 50 parts of a polymerizable methacrylate shown in Table II, 7 parts of an acrylic polymer, 1.5 parts of SQ salt, 0.5 part of cumene hydroperoxide, 1.0 part of water, and 0.1 part of the polymerizable phosphate mixture (hereinafter referred to as HEM-P₂O₅) obtained by reaction of 2-hydroxyethyl methacrylate with phosphorus pentaoxide in a molar ratio of 3:1. The properties of the resulting adhesives were determined, whch are shown in Table II. For the comparison, the properties of a commercial epoxy resin and a commercial anaerobic adhesive were measured, which are also shown in Table II. It is noted from the results that the present adhesive compositions are very excellent in comparison with conventional anaerobic adhesive agents and have adhesive strengths equal to epoxy resins.

TABLE II

| Types of polymerizable methacrylates | Setting time (minutes) | Gelling time at 50° C. (days) | Tensile shear strength (Kg/cm²) | Cleavage strength Kg/25.4 mm | Impact strength (Kg-cm/cm²) |
| --- | --- | --- | --- | --- | --- |
| polyethylene glycol #400 dimethacrylate (degree of polymerization 9) | 10 | >10 | 104.4 | 370 | 7.1 |
| polyethylene glycol #600 dimethacrylate (D.P. 14) | 10 | " | 112.0 | 407 | 7.4 |
| dimethacrylate of 2-mol ethylene oxide adduct of Bisphenol A | 9 | " | 108.5 | 388 | 8.0 |
| BPE 2.6 | 3–4 | " | 106.9 | 438 | 8.9 |
| polyurethane methacrylate (1) | 2–3 | " | 125.9 | 583 | 15.3 |
| (Comp. Ex. 1) epoxy resin (2) | — | — | 111.1 | 518 | 18.7 |
| (Comp. Ex. 2) anaerobic adhesive (3) | 5 | >10 | 32.0 | 112 | 1.4 |

Notes:
(1) an addition product obtained by addition reaction of polyethylene glycol #600, 2-hydroxypropyl methacrylate and 2,4-tolylene diisocyanate in a molar ratio of 1:2:2.
(2) ARALDITE standard, supplied by Nagase Ciba K.K., Japan; two liquid components mixed and then cured by heating at 80° C.
(3) YUMENLOCK SH-5, Okura Kogyo K.K., Japan.

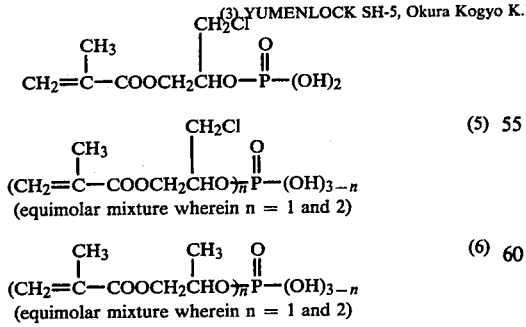

EXAMPLE 3

Adhesive agents were prepared in the same way as in Example 1 from 50 parts of BPE 2.6, 50 parts of a hydroxyl group-containing polymerizable methacrylate shown in Table III, 7.5 parts of an acrylic polymer (degree of polymerization about 1,000 and molecular weight about 100,000), 1.5 parts of SQ salt, 0.5 part of cumene hydroperoxide, 1.0 part of water and 0.1 part of HEM-P₂O₅. The properties of the resulting adhesives were determined, which are shown in the following Table III. The adhesive using 2-hydroxypropyl methacrylate was especially excellent.

TABLE III

| Types of hydroxyl group-containing methacrylates | Setting time (minutes) | Gelling time at 50° C. (days) | Tensile shear strength (Kg/cm$^2$) | Cleavage strength (Kg/25.4 mm) | Impact strength (Kg-cm/cm$^2$) |
|---|---|---|---|---|---|
| 2-hydroxyethyl methacrylate | 5 | >10 | 104.5 | 332 | 6.2 |
| 2-hydroxypropyl methacrylate | 3–4 | " | 106.9 | 438 | 8.9 |
| 2-hydroxybutyl methacrylate | 4 | " | 56.2 | 207 | 5.0 |
| polypropyleneglycol monomethacrylate | 10 | " | 67.4 | 296 | 7.8 |
| 2-hydroxychloropropyl methacrylate | 3 | " | 94.9 | 420 | 7.2 |

EXAMPLE 4, AND COMP. EXAMPLES 4 AND 5

Adhesive agents were prepared in the same way as in Example 1 from 50 parts of 2-hydroxypropyl methacrylate, 50 parts of BPE 2.6, 5 parts of a terminal-methacrylated liquid rubber which had been obtained by addition reaction of the equivalent amount of glycidyl methacrylate to terminal carboxyl groups of HYCAR CTBNX supplied from Ube Kosan, K.K., Japan (equivalent to HYCAR CTBN-X liquid rubber comprising butadiene acrylonitrile acrylic acid terpolymer of The B. F. Goodrich Chemical Company, U.S.A.), 1.5 parts of SQ salt, 0.1 part of cumene hydroperoxide, 0.1 part of HEM-P$_2$O$_5$, and 0 to 3 parts of water. The properties of the resulting adhesives were determined, which are shown in Table IV. It is noted from the results, especially the impact strength is markedly enhanced as the amount of water is increased, and also the setting time becomes very quick in comparison with the case of no water used. When the amount of water is over 3 parts, the resulting properties other than setting time are apt to be lowered.

TABLE IV

| Amount of water added (part) | Setting time (minutes) | Gelling time at 50° C. (days) | Tensile shear strength (Kg/cm$^2$) | Cleavage strength (Kg/25.4 mm) | Impact strength (Kg-cm/cm$^2$) |
|---|---|---|---|---|---|
| (Comp. Ex. 4) 0 | 7 | >10 | 73.7 | 415 | 5.3 |
| 0.5 | 3.5 | " | 81.4 | 460 | 10.4 |
| 1.0 | 3–3.5 | " | 107.8 | 507 | 12.2 |
| 1.5 | 2–3 | " | 125.4 | 420 | 12.1 |
| 2.0 | 1.0–1.5 | " | 111.1 | 390 | 12.0 |
| (Comp. Ex. 5) 3.0 | 1.0 | " | 91.2 | 159 | 9.9 |

EXAMPLE 5, AND COMP. EXAMPLES 6 AND 7

Adhesive agents were prepared in the same way as in Example 1 from 50 parts of 2-hydroxypropyl methacrylate, 50 parts BPE 2.6, 7 parts of an acrylic polymer (degree of polymerization about 1,000 and molecular weight about 100,000), 1.5 parts of SQ salt, 0.5 part of cumene hydroperoxide, 1.0 part of water, and 0 to 0.7 part of HEM-P$_2$O$_5$. The properties of the resulting adhesives were determined, which are shown in Table V. As clearly shown in the table, the adhesive strengths are markedly increased when a trace amount of HEM-P$_2$O$_5$ is present. However, when the amount is larger than 0.4 part, gradual decrease in the strengths is observed and the setting time is also delayed.

TABLE V

| Amount of HEM-P$_2$O$_5$ added (part) | Setting time (minutes) | Gelling time at 50° C. (days) | Tensile shear strength (Kg/cm$^2$) | Cleavage strength (Kg/25.4 mm) | Impact strength (Kg-cm/cm$^2$) |
|---|---|---|---|---|---|
| (Comp. Ex. 6) 0 | 2.5 | >10 | 57.2 | 99 | 1.5 |
| 0.02 | 2.5 | " | 114.4 | 207 | 7.8 |
| 0.05 | 2.5–3 | " | 116.6 | 401 | 8.0 |
| 0.10 | 3–4 | " | 106.7 | 438 | 8.9 |
| 0.40 | 10 | " | 70.4 | 370 | 8.2 |
| (Comp. Ex. 7) 0.70 | >10 | " | 46.2 | 323 | 7.1 |

EXAMPLE 6, AND COMP. EXAMPLES 8 AND 9

Adhesive agents were prepared in the same way as in Example 1 from 50 parts of 2-hydroxypropyl methacrylate, 50 parts of BPE 2.6, 7 parts of an acrylic polymer, 1.5 parts of SQ salt, 1.0 part of water, 0.1 part of HEM-P$_2$O$_5$, and 0 to 2.0 parts of cumene hydroperoxide. The properties of the resulting adhesives were determined, which are shown in Table VI. As clearly shown in the table, only a very small amount of cumene hydroperoxide added results in excellent properties, although no adhesion takes place when the peroxide is not added. The adhesive strengths are rather lowered when the amount of the peroxide added is over 1.0 part.

TABLE VI

| Amount of cumene hydroperoxide added (part) | Setting time (minutes) | Gelling time at 50° C. (days) | Tensile shear strength (Kg/cm$^2$) | Cleavage strength (Kg/25.4 mm) | Impact strength (Kg-cm/cm$^2$) |
|---|---|---|---|---|---|
| (Comp. Ex. 8) 0 | — | >10 | 0 | 0 | 0 |
| 0.005 | 15 | " | 74.1 | 275 | 5.2 |
| 0.02 | 2–3 | " | 115.3 | 472 | 7.0 |
| 0.05 | 2–3 | " | 131.0 | 436 | 8.1 |
| 0.10 | 2–3 | " | 116.3 | 423 | 8.0 |
| 0.50 | 3–4 | " | 106.9 | 438 | 8.9 |
| 1.0 | 7–8 | " | 99.1 | 385 | 7.2 |
| (Comp. Ex. 9) 2.0 | >10 | " | 88.3 | 354 | 2.3 |

COMPARATIVE EXAMPLE 10

An adhesion test was conducted using the corresponding composition in which the HEM-P$_2$O$_5$ phosphate is used as the organic phosphate in Example 1 and SQ salt was excluded. Even 24 hours after bonding, no adhesion took place. It is thus noted that the SQ salt is an essential component in the present invention.

EXAMPLE 7, AND COMP. EXAMPLES 11 THROUGH 13

Adhesive agents were prepared by varying the mixing ratio of 2-hydroxypropyl methacrylate and BPE-2.6 and the amount of the acrylic polymer was also varied as given in the following Table VII to make the viscosity of the resulting compositions substantially constant. The properties of the resulting adhesives were determined as in Example 1, which are shown in Table VIII. Incidentally, the other components incorporated into the adhesives were 1.5 parts of SQ salt, 0.5 part of cumene hydroperoxide, 1.0 part of water and 0.1 part of HEM-P$_2$O$_5$. It is noted from the tables that 90 to 20% by weight of 2-hydroxypropyl methacrylate is required in a methacrylate mixture of the present composition.

TABLE VII

| Components | Run No. | | | | | | | |
|---|---|---|---|---|---|---|---|---|
| | 1 | 2 | 3 | 4 | 5 | 6 | 7 | 8 |
| 2-hydroxypropyl methacrylate (parts) | 100 | 90 | 80 | 50 | 30 | 20 | 10 | 0 |
| BPE-2.6 (parts) | 0 | 10 | 20 | 50 | 70 | 80 | 90 | 100 |
| acrylic polymer (parts) | 8 | 8 | 8 | 7 | 5 | 3 | 0 | 0 |

TABLE VIII

| Adhesives shown in Table VII (Run No.) | Setting time (minutes) | Gelling time at 50° C. (days) | Tensile shear strength (Kg/cm$^2$) | Cleavage strength (Kg/25.4 mm) | Impact strength (Kg-cm/cm$^2$) |
|---|---|---|---|---|---|
| 1 (Comp. Ex. 11) | >15 | >10 | 102.7 | 287 | 2.3 |
| 2 | 10 | " | 120.8 | 362 | 4.9 |
| 3 | 8–9 | " | 110.8 | 410 | 7.8 |
| 4 | 3–4 | " | 106.9 | 438 | 8.9 |
| 5 | 3–4 | " | 96.8 | 376 | 7.6 |
| 6 | 2–3 | " | 104.0 | 346 | 8.3 |
| 7 (Comp. Ex. 12) | 2.0 | " | 79.1 | 164 | 2.5 |
| 8 (Comp. Ex. 13) | 1.5 | " | 49.3 | 91 | 1.8 |

EXAMPLE 8

Oily-surface adhesion properties were determined as to the adhesive composition wherein the polymerizable methacrylate in Example 2 was a polyurethane methacrylate. The results are shown in Table IX. The test conditions were the same as in Example 1 except that a cutting oil was uniformly coated at 0.12×10$^{-3}$ g/cm$^2$ on adherent surfaces. It is noted from the table that satisfactory values of plane surface adhesion are retained inspite of the deposition of oil.

TABLE IX

| Deposition of oil | Properties | | |
|---|---|---|---|
| | Tensile shear strength (Kg/cm$^2$) | Cleavage strength (Kg/25.4 mm) | Impact strength (Kg-cm/cm$^2$) |
| deposited | 129.8 | 434 | 13.4 |
| no oil | 125.9 | 583 | 15.3 |

What is claimed is:

1. A one-part adhesive composition which comprises (i) 100 parts by weight of a mixture comprising 90 to 20% by weight of a hydroxyl-containing polymerizable methacrylate represented by the following general formula (1),

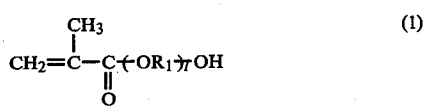

wherein R$_1$ is an alkylene group having 2 to 4 carbon atoms and l stands for an integer of from 1 to 8, and 10 to 80% by weight of a polymerizable methacrylate having 2 or more methacrylic groups, in admixture with (ii) the following components (a) through (d),
(a) 0.02 to 0.5 part by weight of a polymerizable phosphate represented by the following general formula (2),

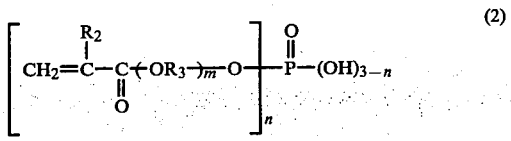

wherein R$_2$ is hydrogen or methyl group, R$_3$ is an alkylene or halogenoalkylene group having 2 to 4 carbon atoms, m stands for an integer of from 1 to 8 and n stands for an integer of 1 or 2,
(b) 0.5 to 5 parts by weight of 1,2,3,4-tetrahydroquinoline salt of o-benzoic sulfimide,
(c) 0.005 to 1.0 part by weight of an organic hydroperoxide, and
(d) 0.2 to 2.5 parts by weight of water.

2. The adhesive composition according to claim 1, in which the polymerizable methacrylate having 2 or more methacrylic groups is selected from the group consisting of a polyalkyleneglycol dimethacrylate, a polyhydric alcohol polymethacrylate, a dimethacrylate of an alkylene oxide adduct of Bisphenol A, an epoxymethacrylate obtained by addition of methacrylic acid to a bisepoxide, a polyester methacrylate obtained by esterification of a dibasic acid, a glycol and methacrylic acid, a terminal-methacrylated product of a liquid rubber, a polyurethane methacrylate obtained by addition reaction of an isocyanate-terminated urethane prepolymer with a hydroxyalkyl methacrylate, and mixtures thereof.

3. The adhesive composition according to claim 1, in which the polymerizable methacrylate having 2 or more methacrylic groups is a monomer represented by the general formula (3),

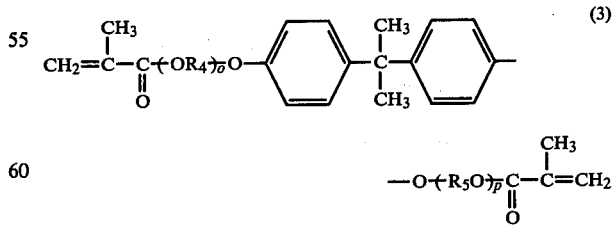

wherein R$_4$ and R$_5$ are an alkylene group having 2 to 4 carbon atoms, respectively, and o and p stands for 1 or 2 with the condition that o+p≦3.

4. The adhesive composition according to claim 1, in which the polymerizable methacrylate having 2 or more methacrylic groups is a urethane dimethacrylate obtained by addition reaction of a compound of the general formula (1), a polyalkylene glycol and a diisocyanate in a molar ratio of 2:1:2.

5. The adhesive composition according to claim 1, in which the compound represented by the general formula (1) is selected from the group consisting of hydroxyethyl methacrylate, hydroxypropyl methacrylate, hydroxybutyl methacrylate, a polyethyleneglycol monomethacrylate, a polypropyleneglycol monomethacrylate and mixtures thereof.

6. The adhesive composition according to claim 1, in which the polymerizable phosphate represented by the general formula (2) is selected from the group consisting of methacryloyloxyethyl acid phosphate, bis(methacryloyloxyethyl) acid phosphate, methacryloyloxypropyl acid phosphate, bis(methacryloyloxypropyl) acid phosphate, methacryloyloxychloropropyl acid phosphate, bis(methacryloyloxychloropropyl) acid phosphate, and mixtures thereof.

7. The adhesive composition according to claim 1, in which the amount of the polymerizable phosphate incorporated represented by the general formula (2) is 0.05 to 0.3 part by weight to 100 parts by weight of a mixture of 90 to 20% by weight of the polymerizable methacrylate represented by the general formula (1) and 10 to 80% by weight of the polymerizable methacrylate having 2 or more methacrylic groups.

8. The adhesive composition according to claim 1, in which the amount of the hydroperoxide incorporated is 0.01 to 0.5 part by weight to 100 parts by weight of a mixture of 90 to 20% by weight of the polymerizable methacrylate represented by the general formula (1) and 10 to 80% by weight of the polymerizable methacrylate having 2 or more methacrylic groups.

9. The adhesive composition according to claim 1, in which the hydroperoxide is selected from the group consisting of t-butyl hydroperoxide, p-methane hydroperoxide, cumene hydroperoxide, diisopropylbenzene hydroperoxide, and mixtures thereof.

* * * * *